(12) United States Patent
Ojima

(10) Patent No.: US 11,942,109 B2
(45) Date of Patent: Mar. 26, 2024

(54) MEMBER, MAGNETIC TAPE DEVICE, ADJUSTMENT METHOD

(71) Applicant: NEC Platforms, Ltd, Kawasaki (JP)

(72) Inventor: Kenichi Ojima, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 424 days.

(21) Appl. No.: 17/287,843

(22) PCT Filed: Oct. 28, 2019

(86) PCT No.: PCT/JP2019/042122
§ 371 (c)(1),
(2) Date: Apr. 22, 2021

(87) PCT Pub. No.: WO2020/090710
PCT Pub. Date: May 7, 2020

(65) Prior Publication Data
US 2021/0383832 A1 Dec. 9, 2021

(30) Foreign Application Priority Data
Nov. 1, 2018 (JP) ................................. 2018-206730

(51) Int. Cl.
*G11B 15/60* (2006.01)
(52) U.S. Cl.
CPC .................... *G11B 15/60* (2013.01)
(58) Field of Classification Search
None
See application file for complete search history.

(56) References Cited

U.S. PATENT DOCUMENTS

| | | | | |
|---|---|---|---|---|
| 4,573,619 A | * | 3/1986 | Grant | G11B 15/60 242/615.3 |
| 5,894,383 A | | 4/1999 | Kinjo et al. | |
| 7,123,432 B2 | * | 10/2006 | Komai | G11B 5/584 360/75 |

(Continued)

FOREIGN PATENT DOCUMENTS

| | | |
|---|---|---|
| JP | S62164611 U | 10/1987 |
| JP | S62180346 U | 11/1987 |

(Continued)

OTHER PUBLICATIONS

International Search Report of PCT Application No. PCT/JP2019/042122 dated Nov. 19, 2021.

(Continued)

*Primary Examiner* — William A. Rivera

(57) ABSTRACT

In order to enable adjustment of the inclination of a guide roller member with respect to a base body, this member is provided with a base body and a guide roller member that is secured to the base body and that determines the advancement direction for a prescribed tape. The guide roller member includes a base part and a rotating shaft that is secured to the base part. In relation to the base body, the base part comes into contact, simultaneously and on the same side as the rotating shaft, with: the leading ends of a plurality of screws that are passed through a plurality of screw holes penetrating the base body; and projecting parts that are connected to or have come into contact with the base part.

16 Claims, 21 Drawing Sheets

(56) References Cited

U.S. PATENT DOCUMENTS

| | | | | |
|---|---|---|---|---|
| 7,227,724 | B2* | 6/2007 | Nayak | G11B 5/5504 |
| | | | | 360/291 |
| 8,619,392 | B2* | 12/2013 | Argumedo | G11B 15/60 |
| | | | | 360/130.21 |
| 10,854,236 | B1* | 12/2020 | Harper | G11B 15/60 |
| 2006/0043235 | A1* | 3/2006 | Hikita | G11B 15/60 |
| | | | | 242/615.3 |
| 2008/0068753 | A1* | 3/2008 | Biskeborn | G11B 5/584 |
| 2009/0201608 | A1* | 8/2009 | Argumedo | G11B 15/60 |
| | | | | 360/130.21 |

FOREIGN PATENT DOCUMENTS

| | | |
|---|---|---|
| JP | S63065145 U | 4/1988 |
| JP | H04137533 U | 12/1992 |
| JP | H08180530 A | 7/1996 |
| JP | 2005228411 A | 8/2005 |
| JP | 2006088569 A | 4/2006 |

OTHER PUBLICATIONS

English translation of Written opinion for PCT Application No. PCT/JP2019/042122 dated Nov. 19, 2021.

* cited by examiner

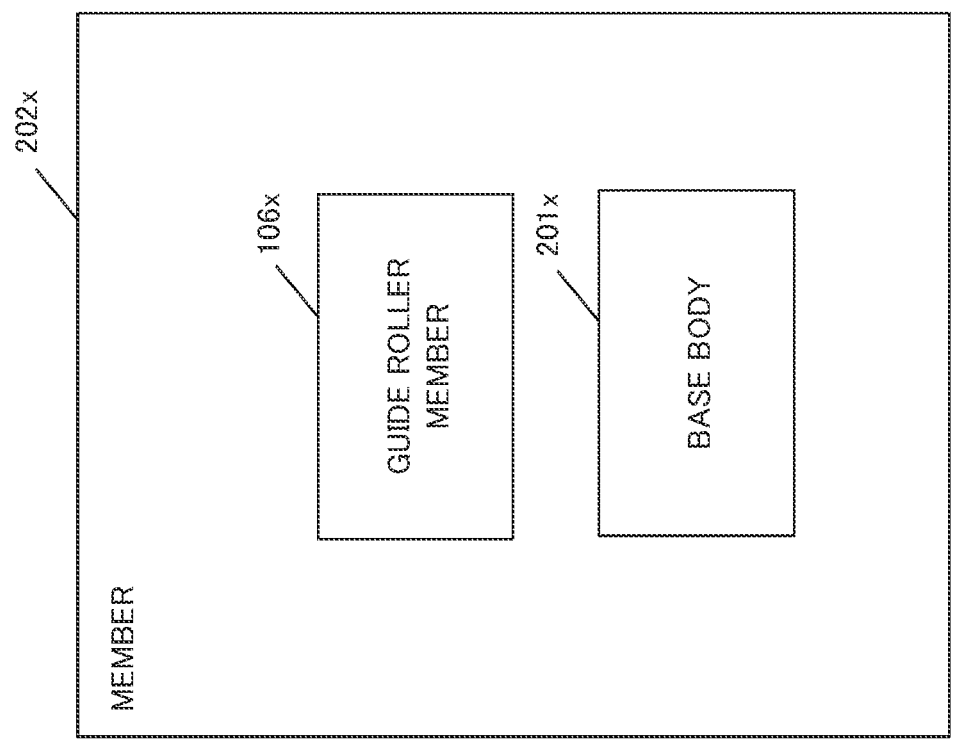

MEMBER, MAGNETIC TAPE DEVICE, ADJUSTMENT METHOD

This application is a National Stage Entry of PCT/JP2019/042122 filed on Oct. 28, 2019, which claims priority from Japanese Patent Application 2018-206730 filed on Nov. 1, 2018, the contents of all of which are incorporated herein by reference, in their entirety.

TECHNICAL FIELD

The present invention relates to a guide roller that guides a tape.

BACKGROUND ART

A magnetic tape device generally includes a mechanism of winding a magnetic tape contained in a cassette onto a reel provided in the magnetic tape device, or winding the magnetic tape that is wound onto the reel onto the cassette. The magnetic tape device includes a guide roller member that allows the magnetic tape to pass through a predetermined position when winding the magnetic tape from the cassette to the reel or from the reel to the cassette.

FIG. 1 is a conceptual diagram illustrating a configuration of a magnetic tape device 100 being an example of a general magnetic tape device. The magnetic tape device 100 includes guide roller members 106a to 106d that guide a tape when winding the magnetic tape from a cassette that is not illustrated onto a reel 261 or winding the magnetic tape that is wound onto the reel 261 onto the cassette.

Herein, PTL 1 discloses a tape loading device that includes a movable mount that pulls out a magnetic tape, a guide that guides the movable mount to an outer circumference of a rotating drum and stops the movable mount on a reference surface, and a loading ring that moves the movable mount along the guide.

Further, PTL 2 discloses a light source device that includes a collimator lens, an assembly reference being a reference when the collimator lens is assembled, and an inclination adjustment means for adjusting inclination of an optical axis of the collimator lens.

CITATION LIST

Patent Literature

[PTL 1] Japanese Unexamined Utility Model Application Publication No. S63-065145
[PTL 2] Japanese Unexamined Patent Application Publication No. 2006-088569

SUMMARY OF INVENTION

Technical Problem

Herein, in order to perform winding operation of the magnetic tape satisfactorily, it is important to accurately adjust an installation angle of a guide roller member on an installation surface. In general, the guide roller member has a variation in inclination with respect to a bottom surface member of a rotating shaft of a guide roller. Therefore, when the guide roller member is installed uniformly on the magnetic tape device 100, there is a possibility that a defect may occur on the winding operation of the magnetic tape.

An object of the present invention is to provide a member and the like capable of adjusting inclination of a guide roller member with respect to a base body.

Solution to Problem

A member according to the present invention includes a base body and a guide roller member that is secured to the base body and that determines an advancing direction for a predetermined tape. The guide roller member includes a base part and a rotating shaft that is secured to the base part. The base part comes into contact, simultaneously and on the same side as the rotating shaft in relation to the base body, with leading ends of a plurality of screws that are passed through a plurality of screw holes penetrating the base body, and a projecting part that is connected to or comes into contact with the base part.

Advantageous Effects of Invention

The member and the like according to the present invention enable adjustment of inclination of the guide roller member with respect to the base body.

BRIEF DESCRIPTION OF DRAWINGS

FIG. 21 is a block diagram illustrating a minimum configuration of the magnetic tape device according to the example embodiments.

EXAMPLE EMBODIMENT

First Example Embodiment

A first example embodiment is an example embodiment relating to a partial structure of a magnetic tape in which an angle of a rotating shaft with respect to a deck base is adjustable.

(Configuration and Operation)

Figure 2:
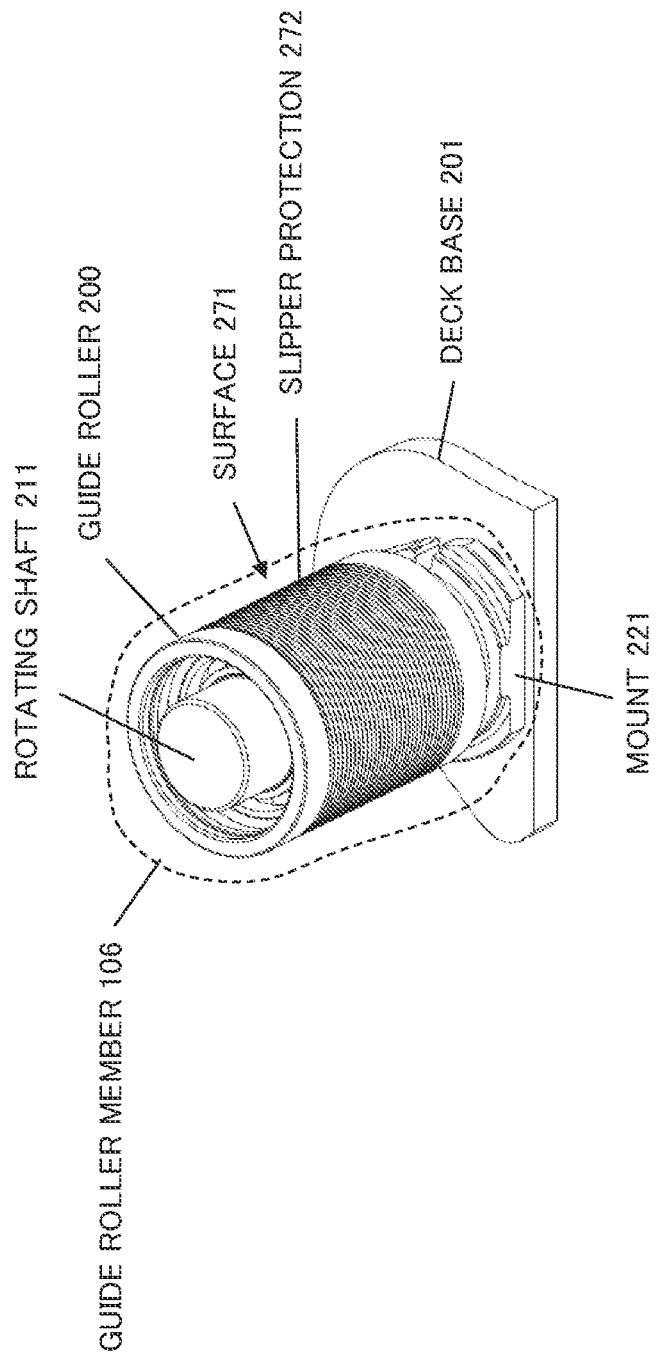
FIG. 2 is a perspective view conceptually illustrating a configuration example of a guide roller member and a deck base according to a first example embodiment.

FIG. 2 is a perspective view conceptually illustrating a configuration example of a guide roller member 106 and a deck base 201 being examples of a guide roller member and a deck base according to the present example embodiment.

Figure 1:
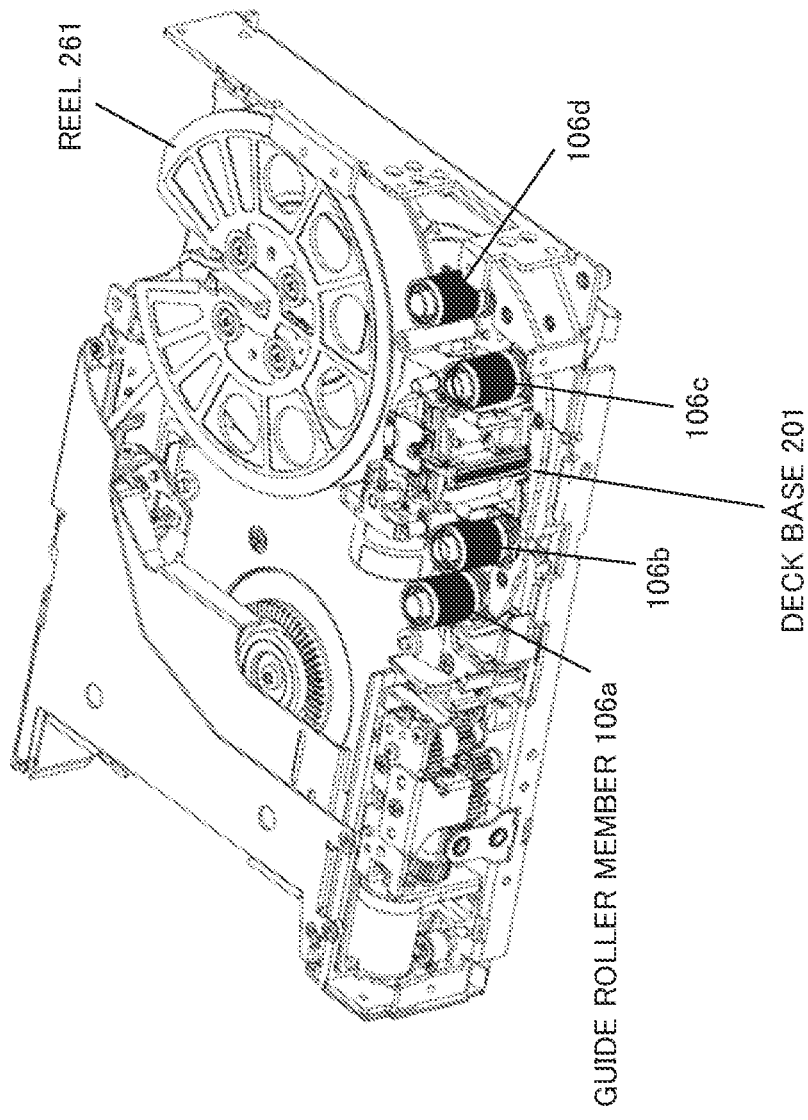
FIG. 1 is a conceptual diagram illustrating a configuration example of a general magnetic tape device.

The guide roller member 106 and the deck base 201 illustrated in FIG. 2 are applicable as guide roller members 106a to 106d and a deck base 201 of the magnetic tape device 100 illustrated in FIG. 1.

The deck base 201 is a common member for installing the guide roller members 106a to 106d of the magnetic tape device 100 illustrated in FIG. 1. The deck base 201 illustrated in FIG. 2 is a part of the deck base 201 illustrated in FIG. 1.

The guide roller member 106 includes a mount 221, a rotating shaft 211, and a guide roller 200.

The rotating shaft 211 is secured in a direction substantially perpendicular to a surface of the mount 221.

A surface 271 of the guide roller 200 is a surface with which the magnetic tape to be guided comes into contact. A slip protection is formed on the surface 271 in order to prevent the magnetic tape from slipping. The guide roller 200 is connected to the rotating shaft 211 via a bearing member that is not illustrated. The connection allows the guide roller 200 to rotate around the rotating shaft 211.

The mount 221 is secured to the deck base 201. The angle between a bottom surface of the mount 221 and an upper surface of the deck base 201 can be adjusted by a mechanism to be described below.

Figure 3:
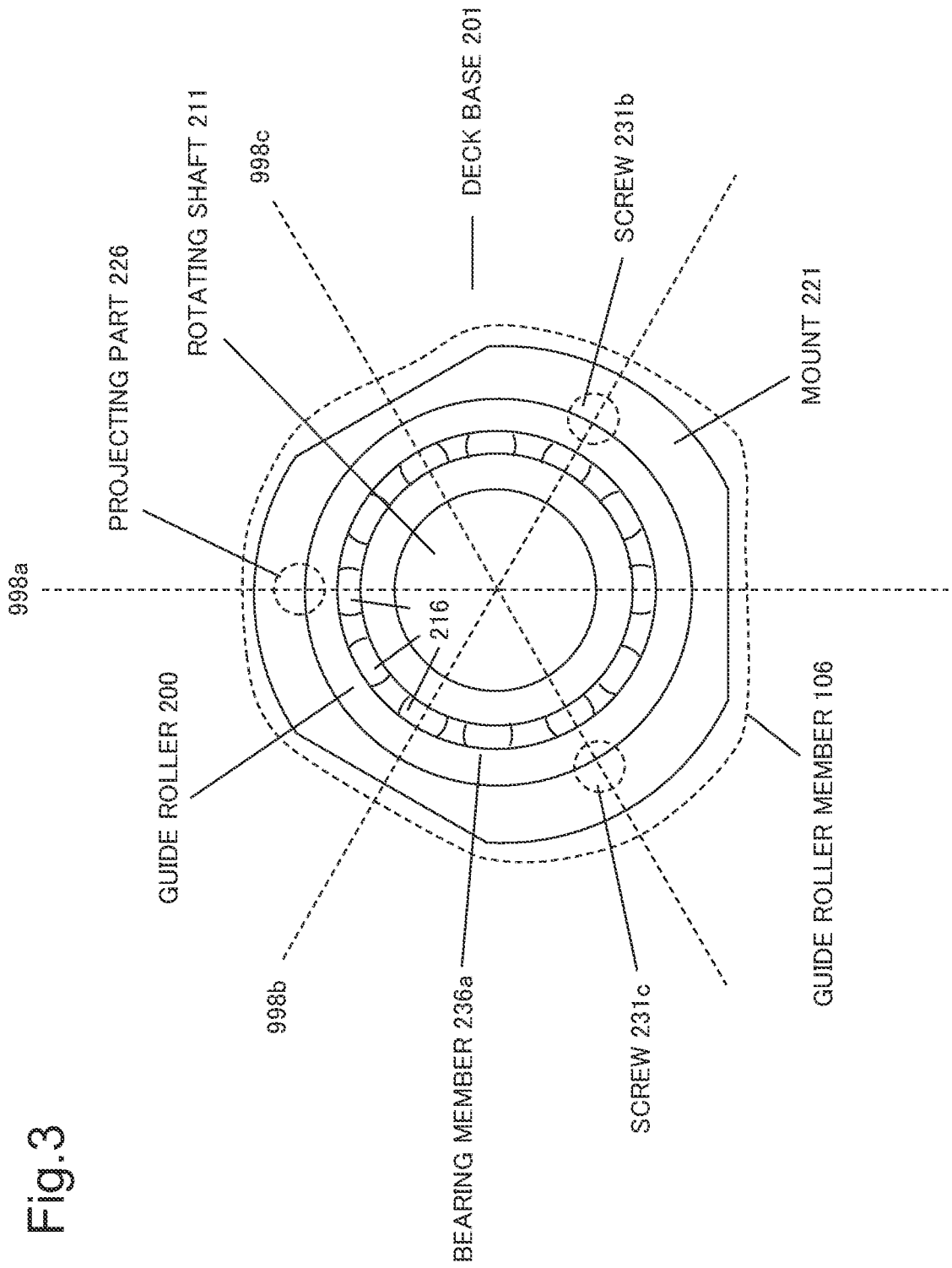
FIG. 3 is a top view conceptually illustrating the guide roller member and the deck base illustrated in FIG. 2.
Figure 4:
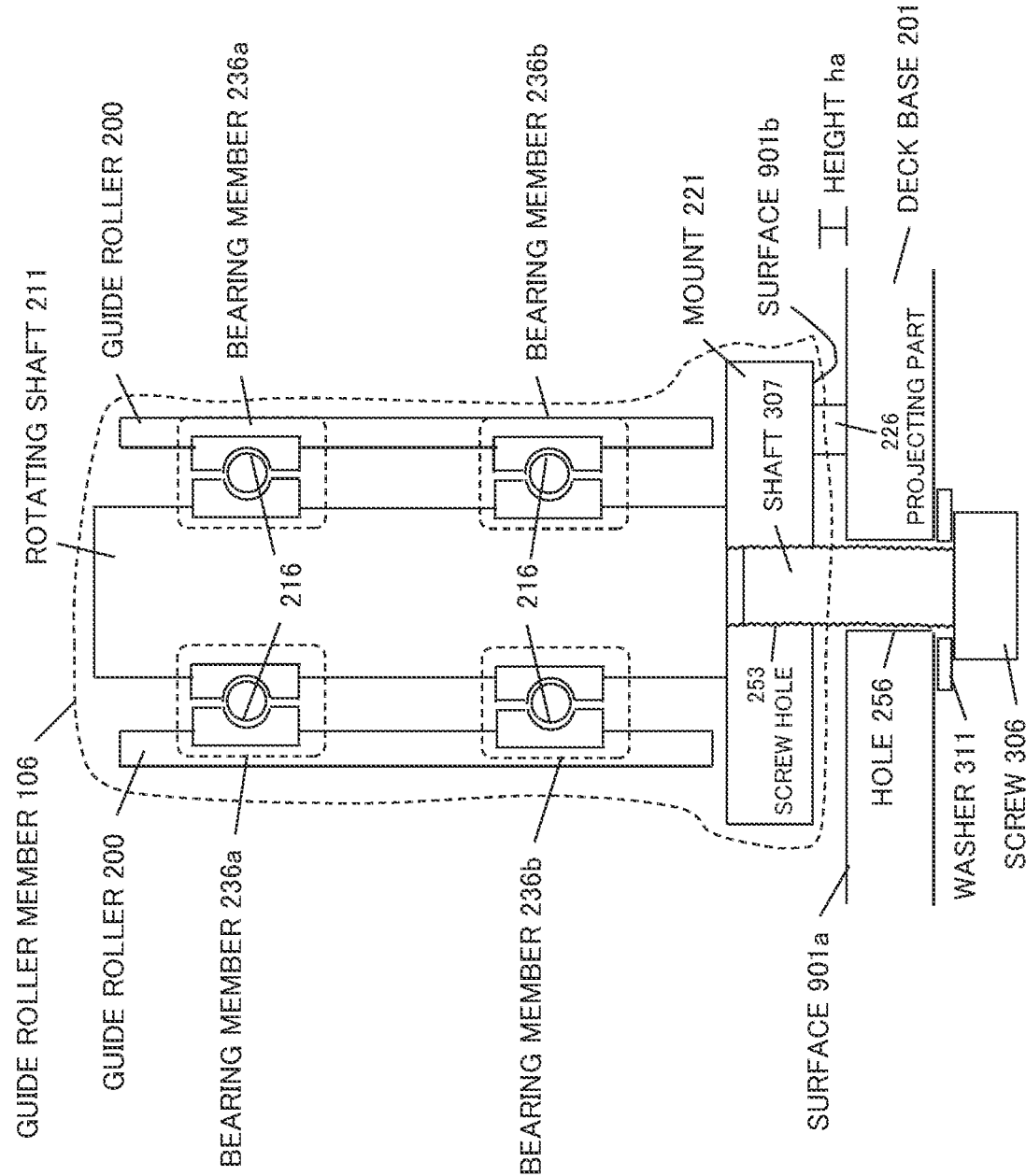
FIG. 4 is a cross-sectional view (No. 1) conceptually illustrating the guide roller member and the deck base illustrated in FIG. 2.
Figure 5:
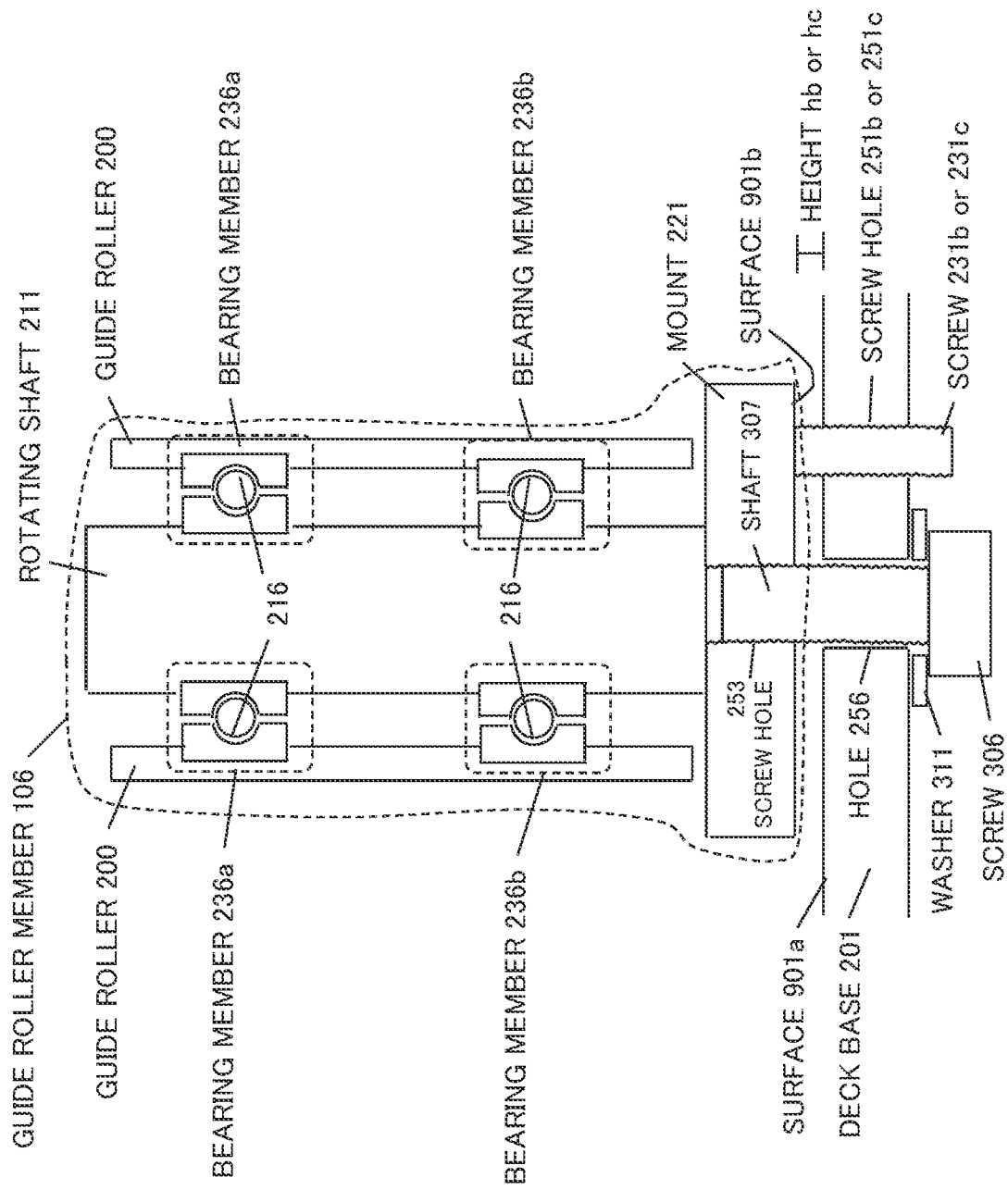
FIG. 5 is a cross-sectional view (No. 2) conceptually illustrating the guide roller member and the deck base illustrated in FIG. 2.

FIG. 3 is a top view of the guide roller member 106 and the deck base 201 illustrated in FIG. 2. FIG. 4 is a cross-sectional view assuming that the guide roller member 106 and the deck base 201 are cut along a line 998a illustrated in FIG. 3. FIG. 5 is a cross-sectional view assuming that the guide roller member 106 and the deck base 201 are cut along a line 998b or a line 998c illustrated in FIG. 3. Illustration of a slip protection 272 illustrated in FIG. 2 is omitted in FIGS. 3 to 4.

The guide roller member 106 includes a mount 221, a guide roller 200, and bearing members 236a and 236b.

The rotating shaft 211 is secured to an upper surface of the mount 221 in such a way as to be substantially perpendicular to the upper surface as illustrated in FIGS. 4 and 5.

The guide roller 200 is connected to the rotating shaft 211 via the bearing member 236a. The guide roller 200 can rotate around the rotating shaft 211 by the rotation of a bearing 216 included in the bearing member 236a.

As illustrated in FIG. 4, a projecting part 226 is formed on the deck base 201.

Further, the deck base 201 is formed with screw holes 251b and 251c in which a predetermined thread groove is formed on a side surface. Screws 231b and 231c are inserted in the screw holes 251b and 251c. A thread that can be screwed with the thread groove is formed on each side surface of the screws 231b and 231c.

As illustrated in FIG. 5, the screws 231b and 231c each project upward by a height hb or hc, from a surface 901a being the upper surface of the deck base 201.

The mount 221 is secured to the deck base 201 in which a surface 901b being a lower surface of the mount 221 is in contact with each upper end of the projecting part 226 and the screws 231b and 231c. Securing the mount 221 is performed by inserting a shaft 307 of a screw 306 that can be screwed into a screw hole 253 formed in the mount 221 and tightening the screw 306 via a washer 311.

An angle in a longitudinal direction that the rotating shaft 211 forms with respect to the surface 901a of the deck base 201 can be adjusted by heights ha, hb, and hc. Herein, the height ha is a height of the projecting part 226 illustrated in FIG. 4. Further, the height hb is a height at which the screw 231b projects from the surface 901a. Further, the height hc is a height at which the screw 231c projects from the surface 901a.

(Method of Installing Guide Roller Member on Deck Base)

Figure 6:
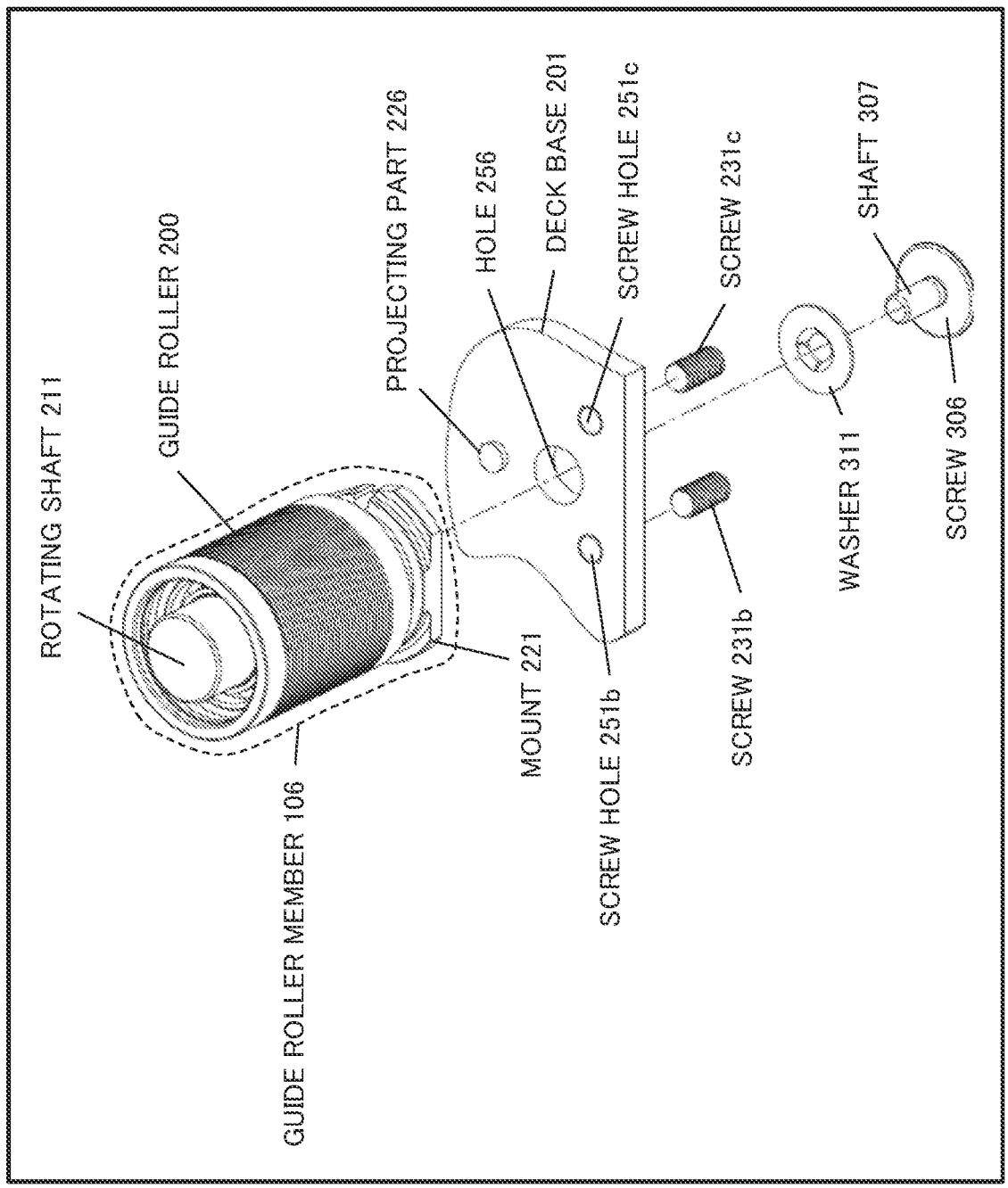
FIG. 6 is an exploded and perspective view conceptually illustrating the guide roller member and the deck base illustrated in FIG. 2.

FIG. 6 is an exploded and perspective view conceptually illustrating the guide roller member 106 illustrated in FIG. 2.

In order to assemble each component illustrated in FIG. 6 and constitute a state illustrated in FIG. 2, first, the screws 231b and 231c are inserted into the screw holes 251b and 251c being formed in the deck base 201, respectively, and adjustment is roughly performed. The rough adjustment is such that each upper end of the screws 231b and 231c is projected from the upper surface of the deck base 201 by an appropriate height.

It is important to perform the rough adjustment in such a way that a length of each upper end of the screws 231b and 231c projected from the upper surface of the deck base 201 becomes a predetermined value. A reason for this is that it is difficult to accurately perform fine adjustment after the rough adjustment unless the projected length reaches the predetermined value.

As a method that can solve this point, there is a method using a jig as described below.

Figure 7:
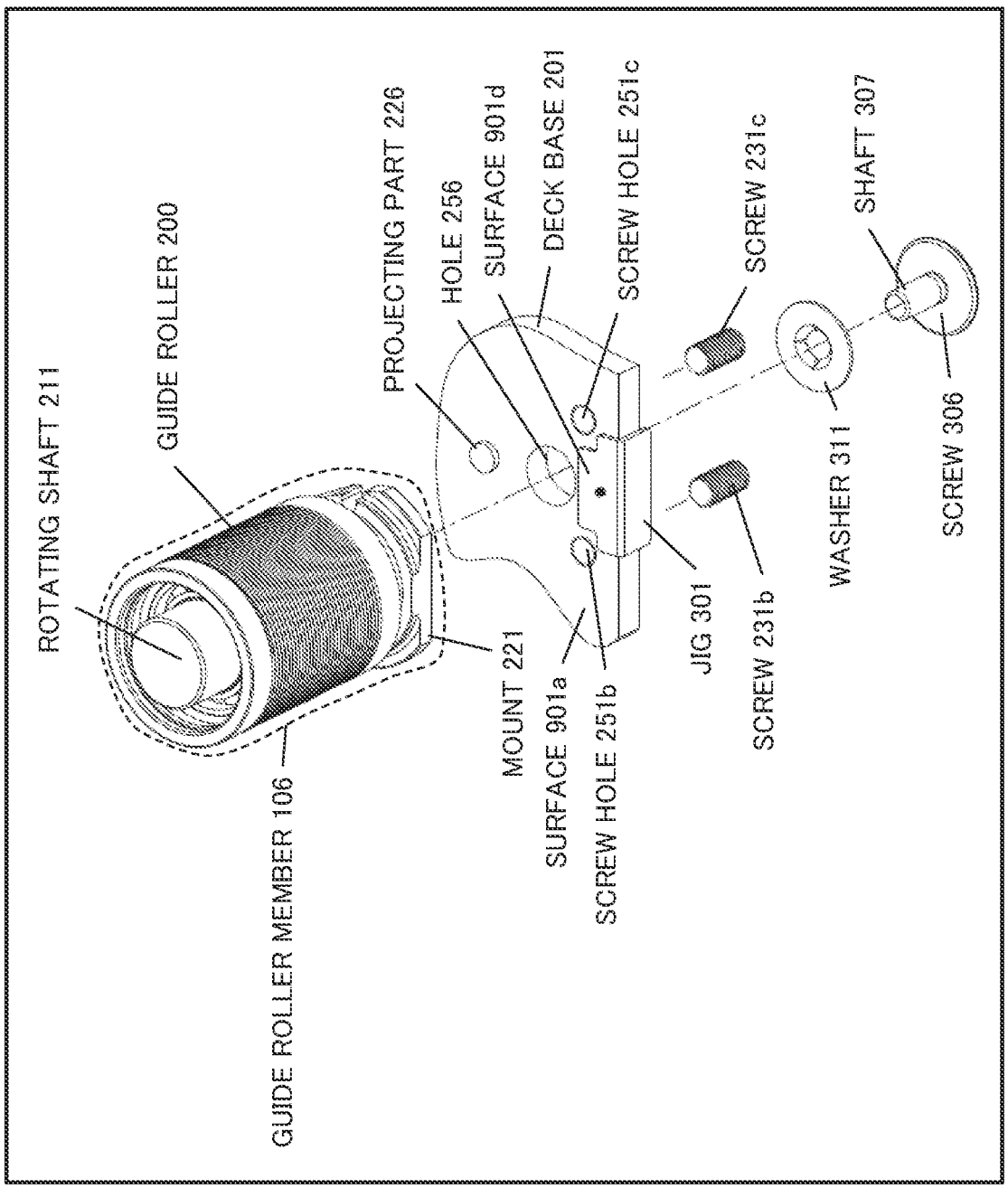
FIG. 7 is an exploded and perspective view illustrating the guide roller member and the deck base that are supposed to be assembled by using a jig.

FIG. 7 is an exploded and perspective view illustrating the guide roller member 106 that are supposed to be assembled by using a jig 301.

In the guide roller member 106 illustrated in FIG. 7, the jig 301 is attached near the front surface of the deck base 201. The height of a surface 901d being an upper surface of the jig 301 from the surface 901a being the upper surface of the deck base 201 is slightly lower than the height of the upper end of the projecting part 226 from the surface 901a. A reason for this is to increase a degree of freedom for adjustment of the rotating shaft 211.

Assembling the guide roller member 106 according to the present example embodiment is performed by a procedure to be described below.

Figure 8:
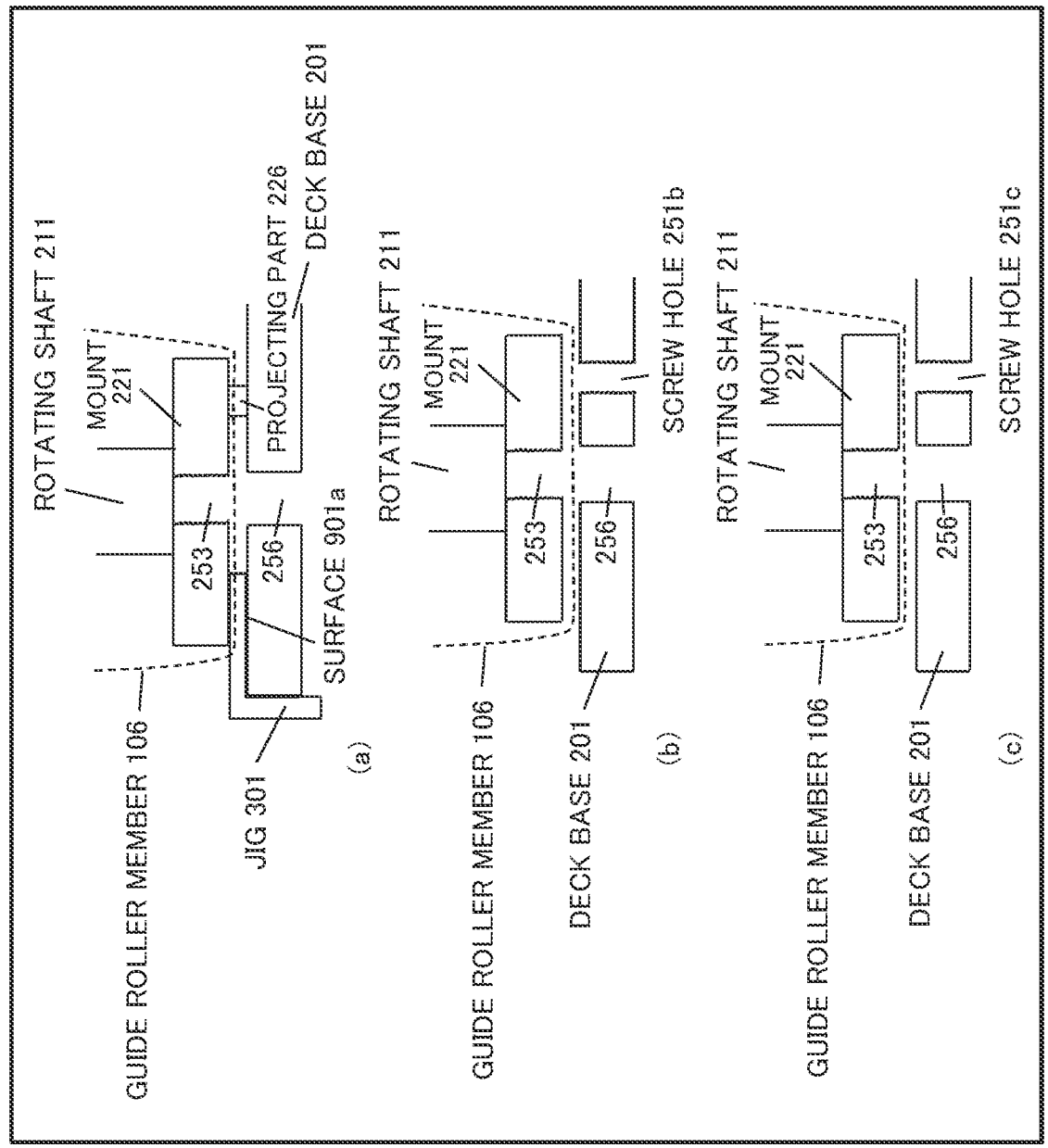
FIG. 8 is a diagram (No. 1) illustrating an installation procedure of the guide roller member to the deck base according to the first example embodiment.
Figure 9:
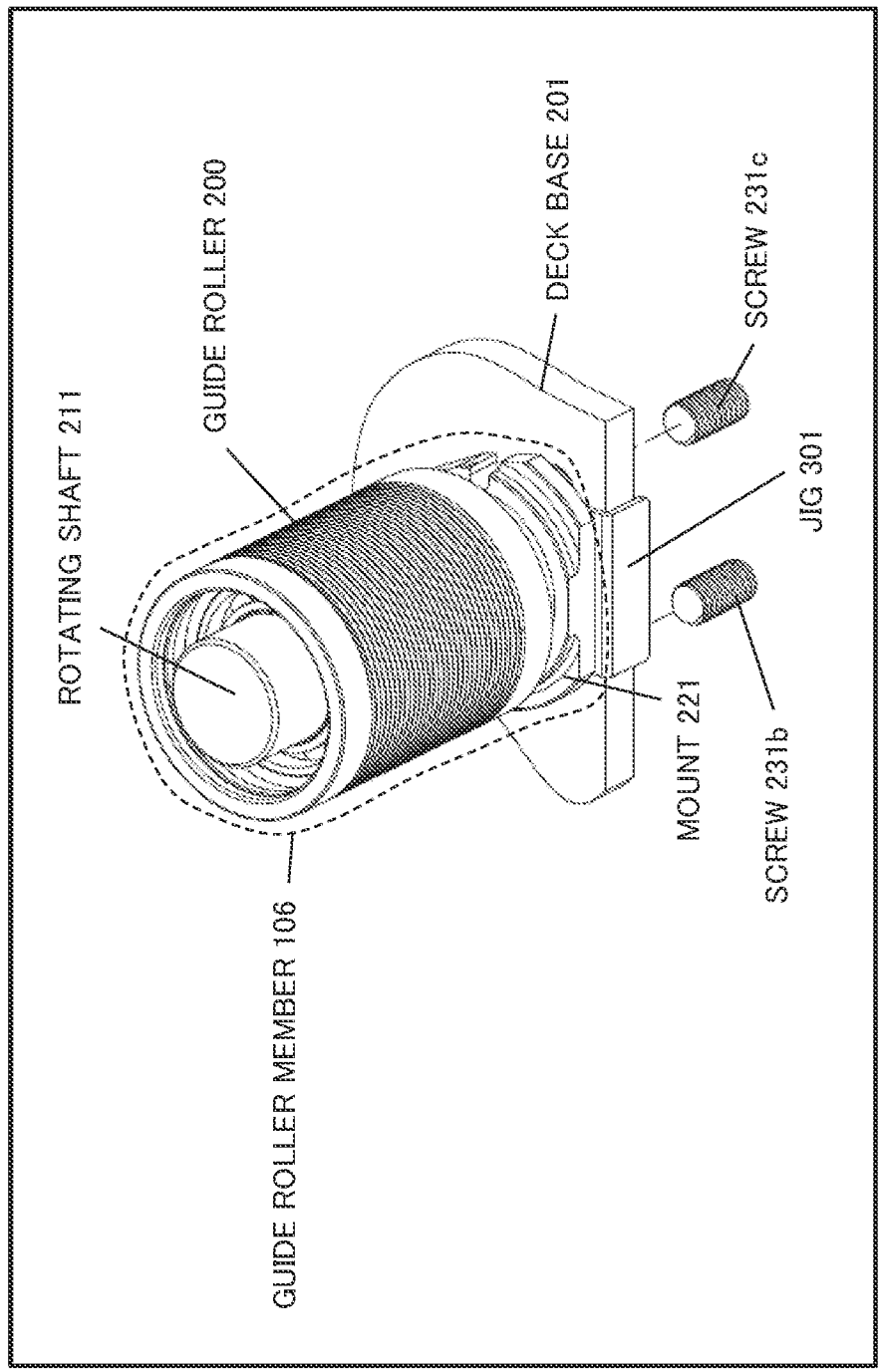
FIG. 9 is a diagram (No. 2) illustrating the installation procedure of the guide roller member to the deck base according to the first example embodiment.
Figure 10:
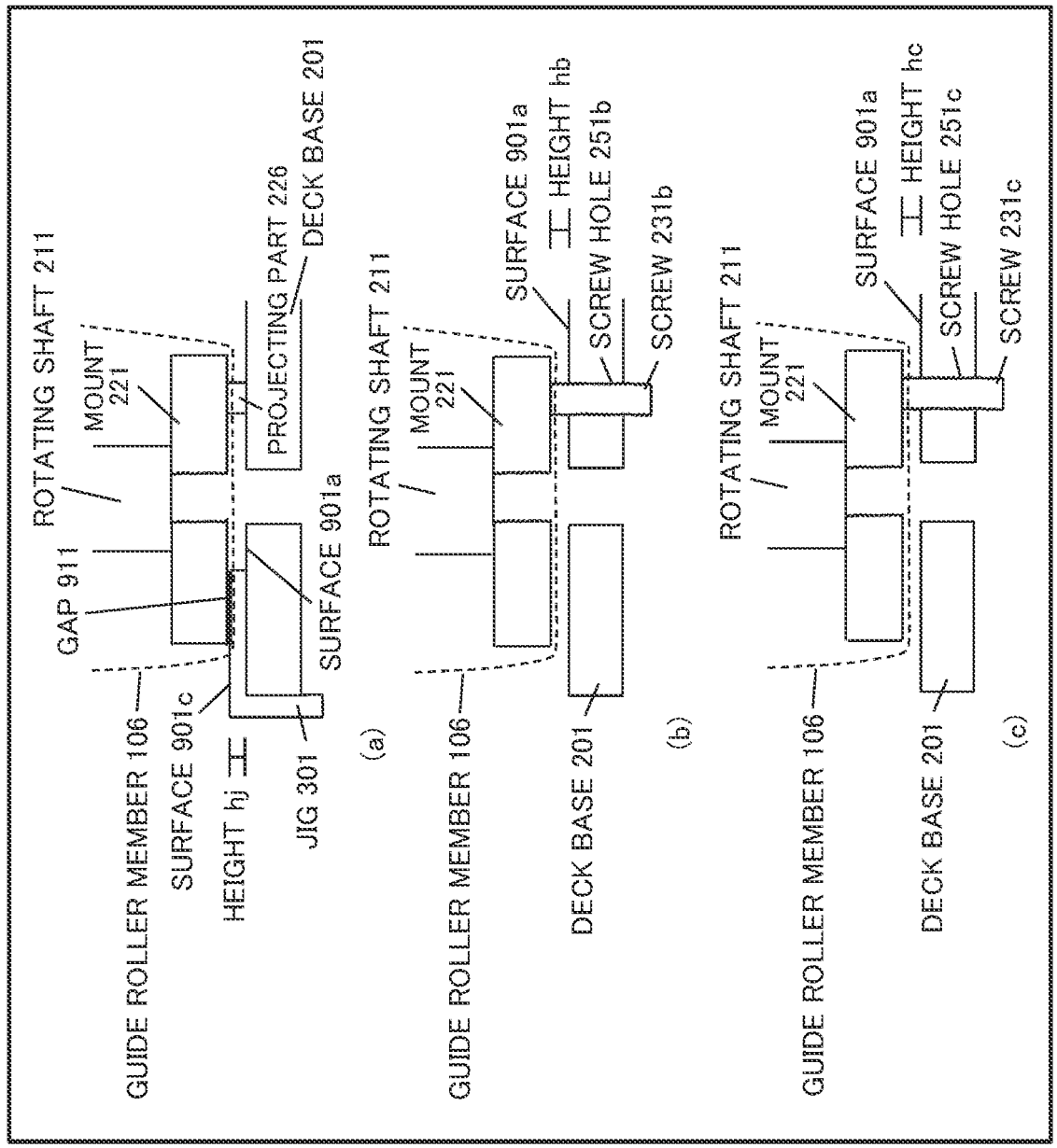
FIG. 10 is a diagram (No. 3) illustrating the installation procedure of the guide roller member to the deck base according to the first example embodiment.
Figure 11:
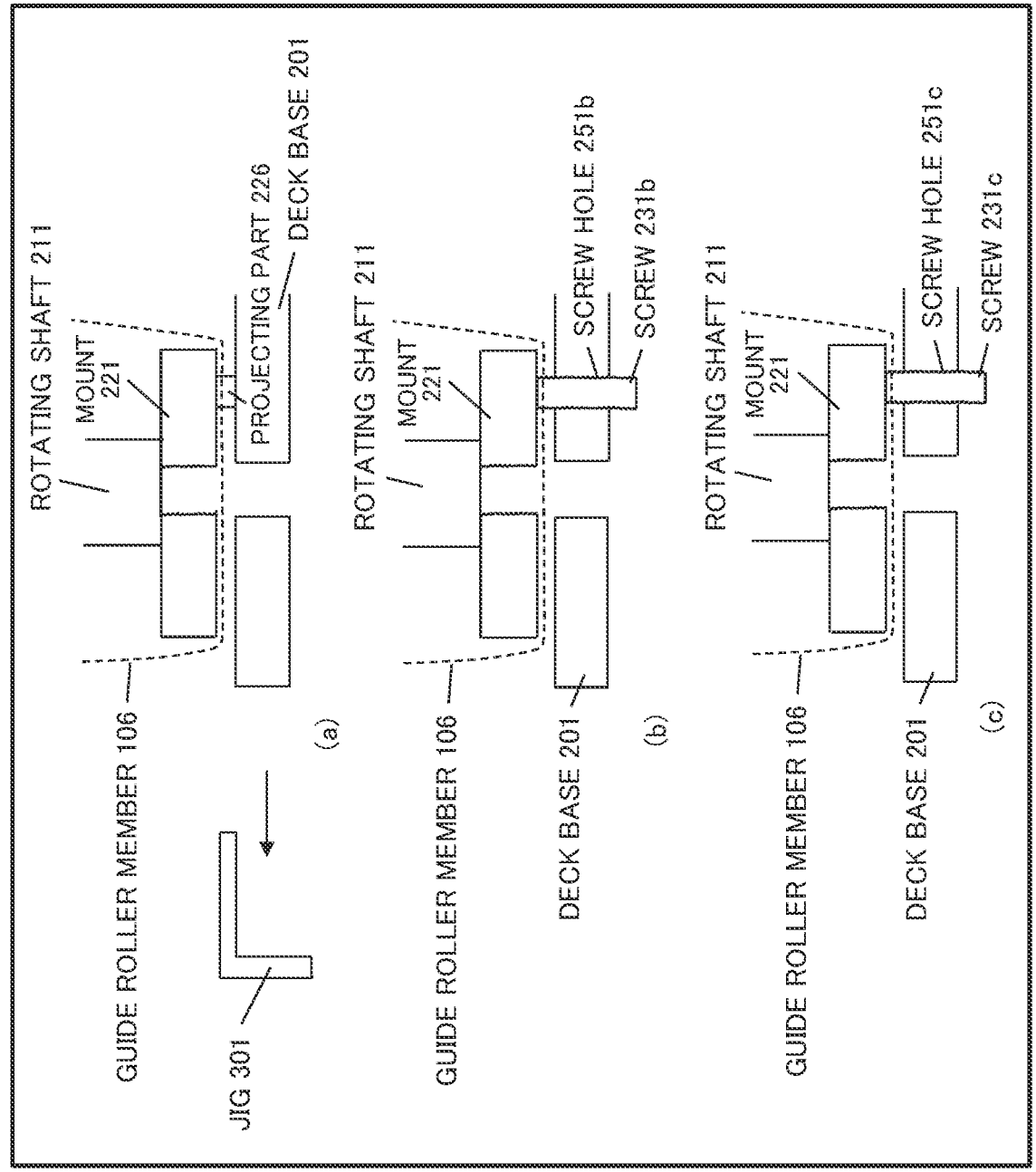
FIG. 11 is a diagram (No. 4) illustrating the installation procedure of the guide roller member to the deck base according to the first example embodiment.

FIGS. 8 to 13 are diagrams illustrating an installation procedure of the guide roller member 106 to the deck base 201 according to the present example embodiment. Each of (a), (b), and (c) in each of FIGS. 8, 10, and 11 is a cross-sectional diagram assuming that the guide roller member 106 is cut along each of the lines 998a, 998b, and 998c illustrated in FIG. 3. Note that, in FIGS. 8 to 14, among the configurations of the guide roller member 106 illustrated in FIGS. 4 to 6, illustrations of the guide roller 200, the bearing members 236a and 236b, and the upper part of the rotating shaft 211 are omitted.

First, the jig 301 is installed on the surface 901a of the deck base 201 as illustrated in FIG. 8(a), and the mount 221 is placed in such a way that a central axis of the screw hole 253 coincides with a central axis of a hole 256 as illustrated in FIGS. 8(a) to (c). This configuration allows the guide roller member 106 to be placed on the jig 301 and the projecting part 226 without support.

FIG. 9 is a perspective view of the state illustrated in FIG. 8.

In the state illustrated in FIG. 9, the screws 231b and 231c are inserted into the screw holes of the deck base 201.

FIGS. 10(a) to (c) are diagrams illustrating how each of the screws 231b and 231c is inserted into each of the screw holes 251b and 251c of the deck base 201.

In this state, the heights hb and hc being a distance between each upper end of the screws 231b and 231c and the surface 901a being the upper surface of the deck base 201 are set in such a way as to be slightly higher than a height hj being a distance between a surface 901c being the upper surface of the jig 301 and the surface 901a. Thus, a gap 911 being a minute gap is formed above the surface 901c.

In FIGS. 10(a) to (c), the guide roller member 106 is placed on the projecting part 226, the upper end of the screw 231b, and the upper end of the screw 231c.

Figure 12:
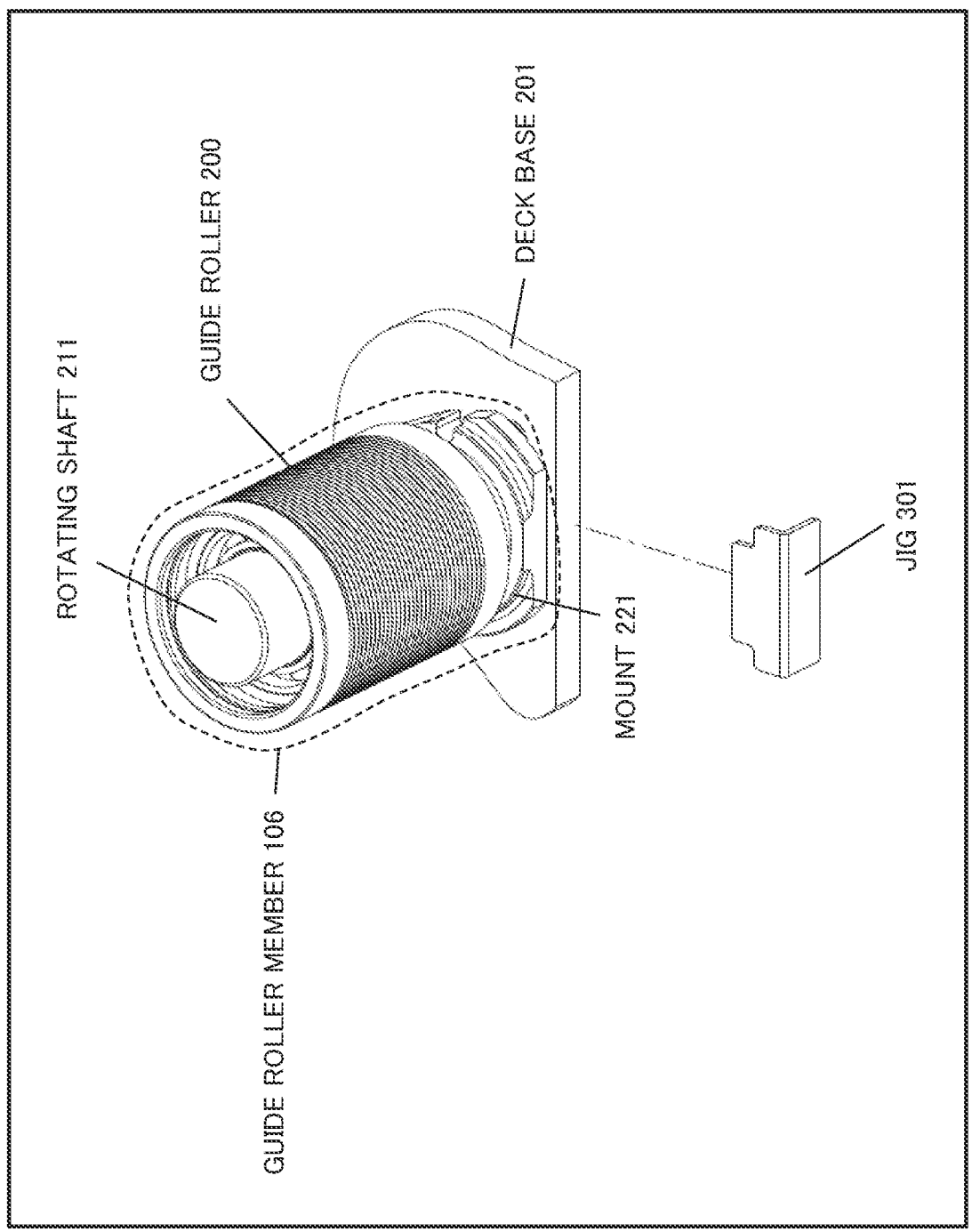
FIG. 12 is a diagram (No. 5) illustrating the installation procedure of the guide roller member to the deck base according to the first example embodiment.

From the state illustrated in FIG. 10, the jig 301 is pulled out from the place between the deck base 201 and the mount 221 as illustrated in the cross-sectional views in FIGS. 11(a) to (c) and the perspective view in FIG. 12.

Then, the angle of the rotating shaft 211 with respect to the upper surface of the deck base is determined by fine adjustment of an insertion length of each of the screws 231b and 231c into each of the screw holes 251b and 251c. A specific method of the fine adjustment is not related to the present example embodiment, and thus the description is omitted.

Figure 13:
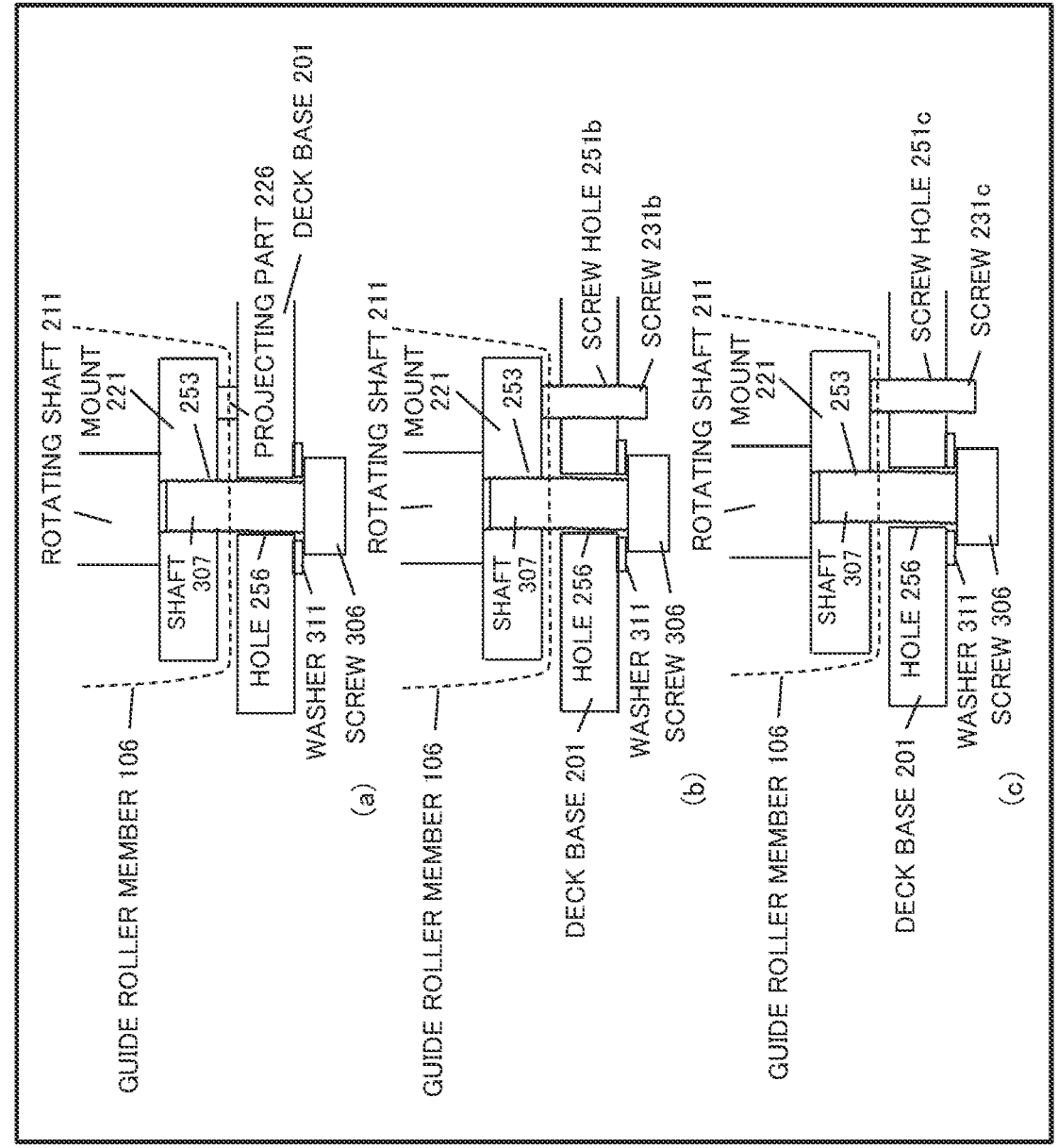
FIG. 13 is a diagram (No. 6) illustrating the installation procedure of the guide roller member to the deck base according to the first example embodiment.

Then, as illustrated in FIG. 13, the shaft of the screw 306 passes through the hole 256 and is inserted into the screw hole 253, and thus the mount 221 is secured to the deck base 201 and the finely adjusted angle of the rotating shaft 211 being secured to the mount 221 with respect to the upper surface of the deck base is maintained.

In the above description, the case where the projecting part is formed in the deck base is described, however the projecting part may be formed in the mount.

Advantageous Effects

The mount of the guide roller member according to the present example embodiment is secured to the deck base in the state where the lower surface of the mount is in contact with the projecting part formed on the deck base and each of leading ends of the two screws inserted into each of the two holes formed on the deck base. Therefore, the angle of the rotating shaft of the guide roller member with respect to the deck base can be adjusted by the projected length of each of the two screws from the deck base. As a result, the combination of the guide roller member and the deck base according to the present example embodiment enables adjustment of inclination of the guide roller member with respect to the deck base.

Second Example Embodiment

The present example embodiment is an example embodiment relating to a configuration that facilitates installation of a guide roller member on a deck base according to the first example embodiment.
(Configuration and Operation)

Figure 14:
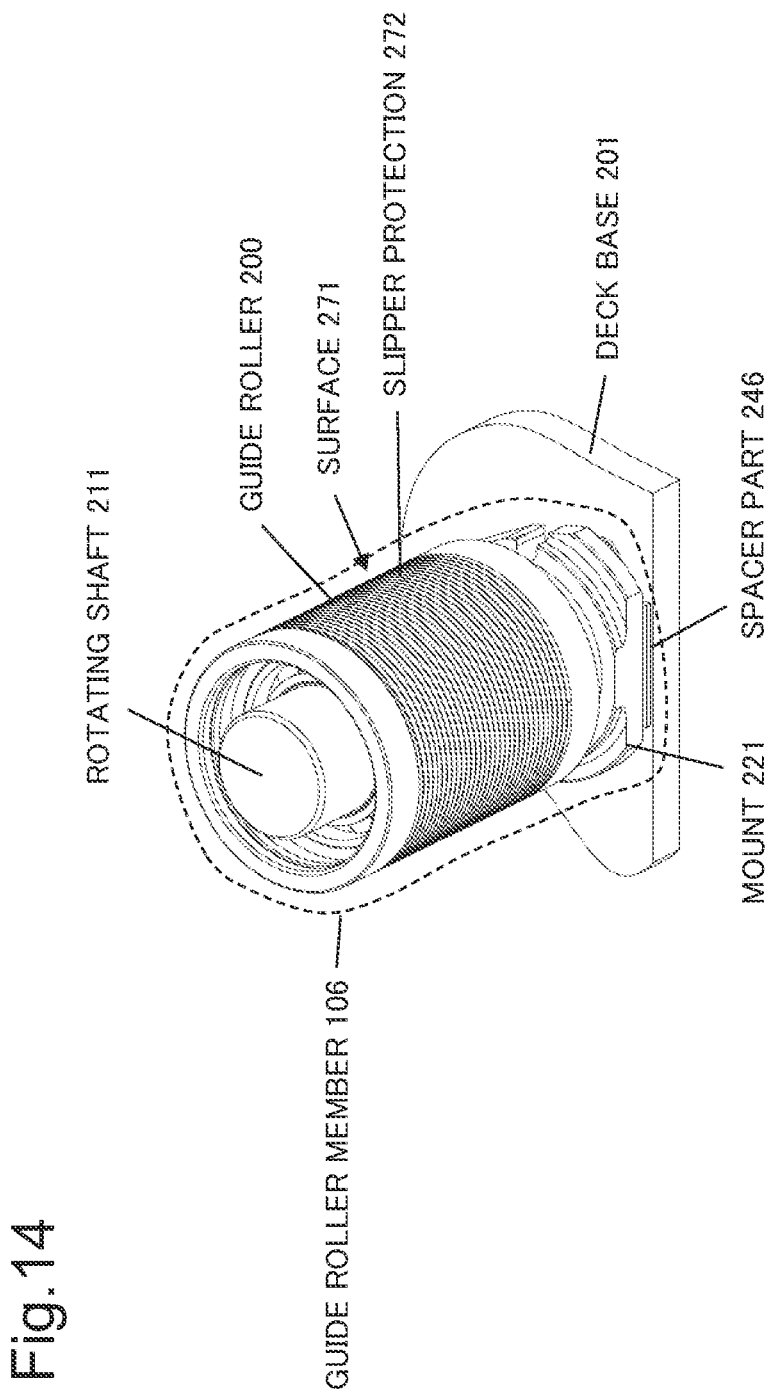
FIG. 14 is a perspective view conceptually illustrating a configuration example of a guide roller member and a deck base according to a second example embodiment.
Figure 15:
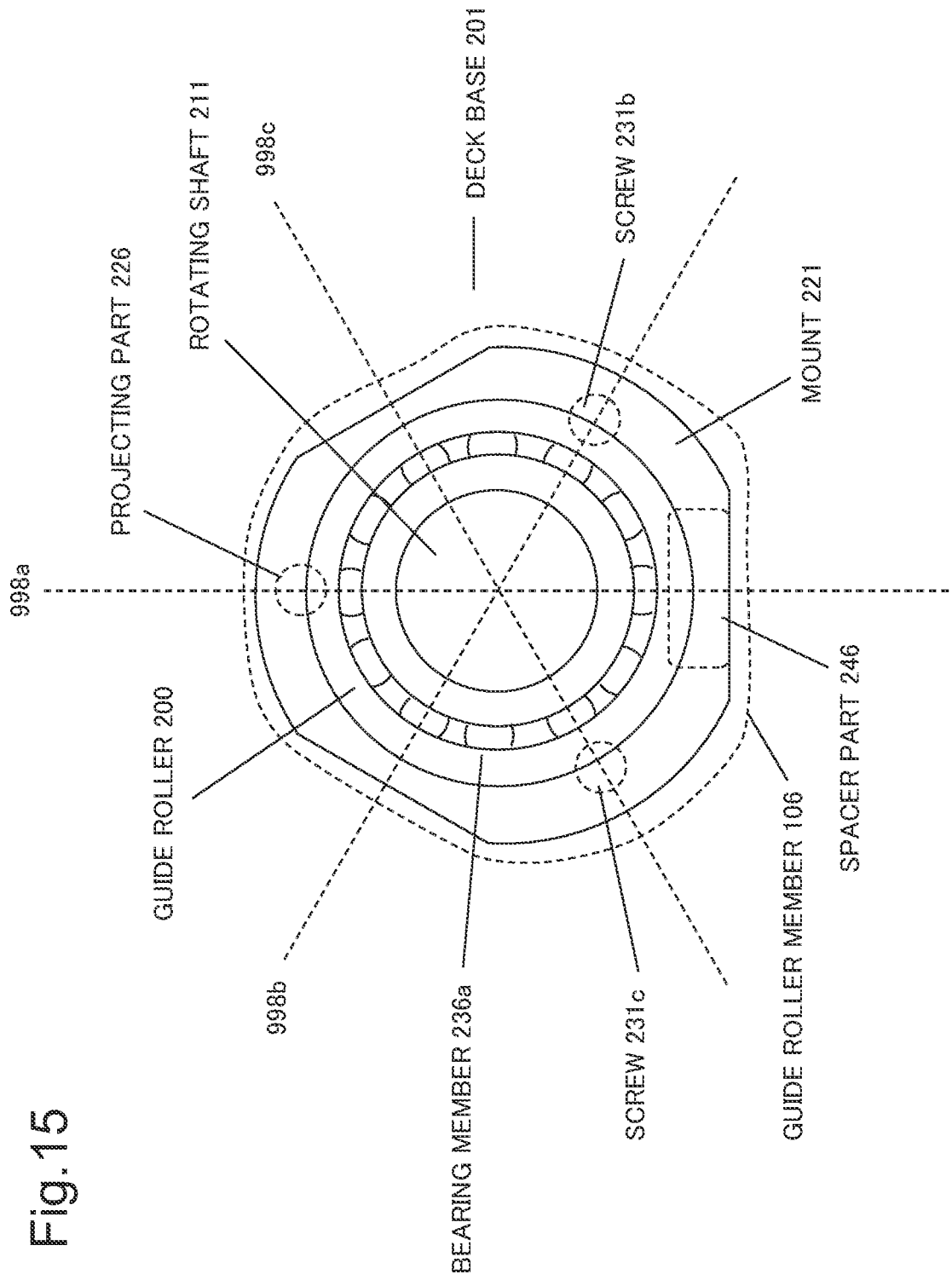
FIG. 15 is a top view conceptually illustrating the guide roller member and the deck base according to the second example embodiment.
Figure 16:
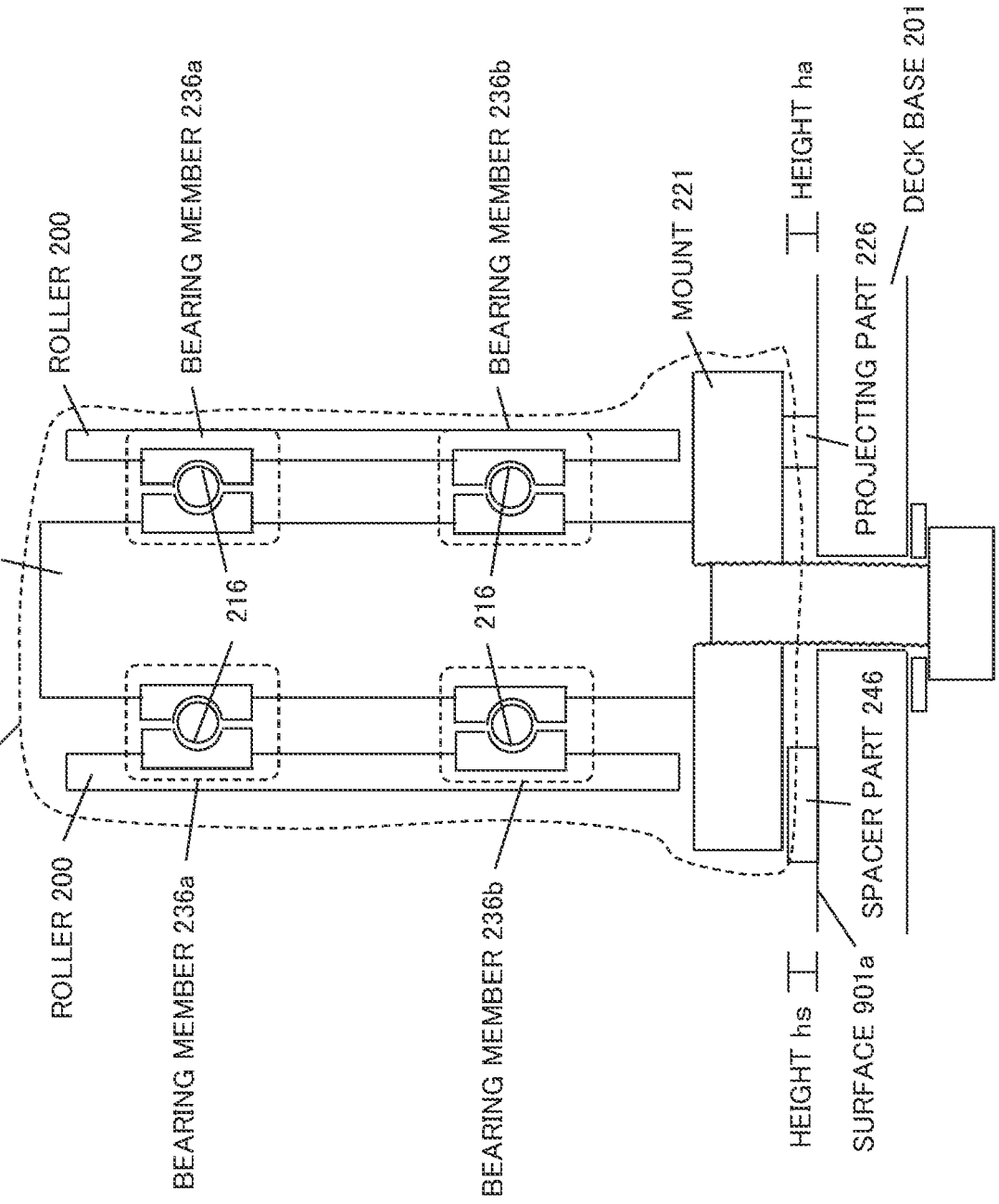
FIG. 16 is a cross-sectional view (No. 1) conceptually illustrating the guide roller member and the deck base according to the second example embodiment.
Figure 17:
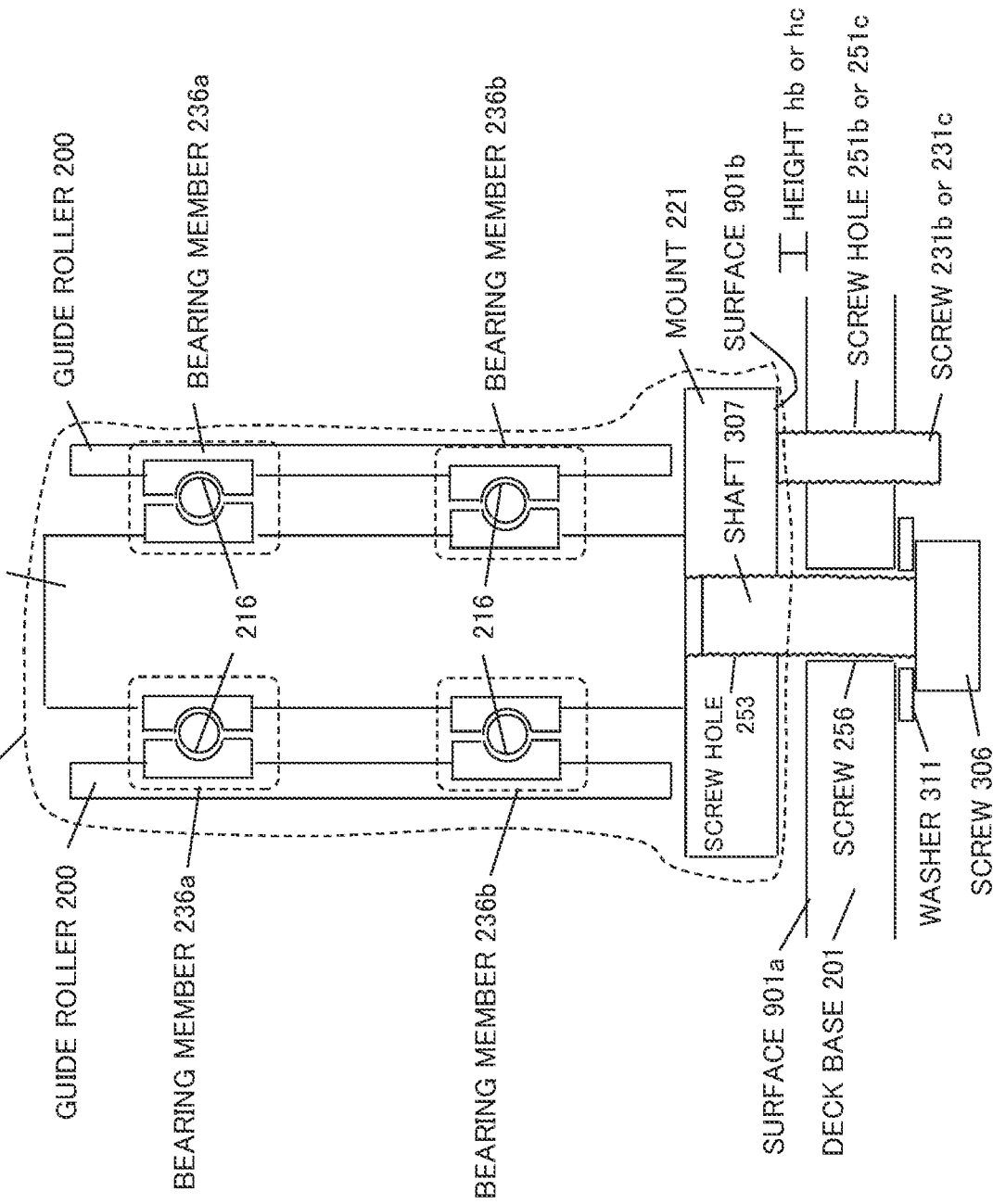
FIG. 17 is a cross-sectional view (No. 2) conceptually illustrating the guide roller member and the deck base according to the second example embodiment.

FIG. 14 is a perspective view conceptually illustrating a configuration of a guide roller member 106 and a deck base 201 being an example of a guide roller member and a deck base according to a second example embodiment. FIG. 15 is a top view conceptually illustrating the guide roller member 106 and the deck base 201 illustrated in FIG. 14. FIG. 16 conceptually illustrates a cross-sectional view supposing that the guide roller member 106 and the deck base 201 are cut along a line 998a illustrated in FIG. 16. FIG. 17 conceptually illustrates a cross-sectional view supposing that the guide roller member 106 and the deck base 201 are cut along a line 998b or a line 998c illustrated in FIG. 16.

Description of FIGS. 14 to 17 is the same as the description of the guide roller member 106 and the deck base 201 illustrated in FIGS. 2 to 5 except that a spacer part 246 is provided between a mount 221 and the deck base 201.

The spacer part 246 is formed on the deck base 201. A height hs being the height of an upper surface of the spacer part 246 from a surface 901a being an upper surface of the deck base is close to the height ha being a height of an upper surface of a projecting part 226 from the surface 901a, but is slightly lower than the height ha.
(Method of Installing Guide Roller Member on Deck Base)

Figure 18:
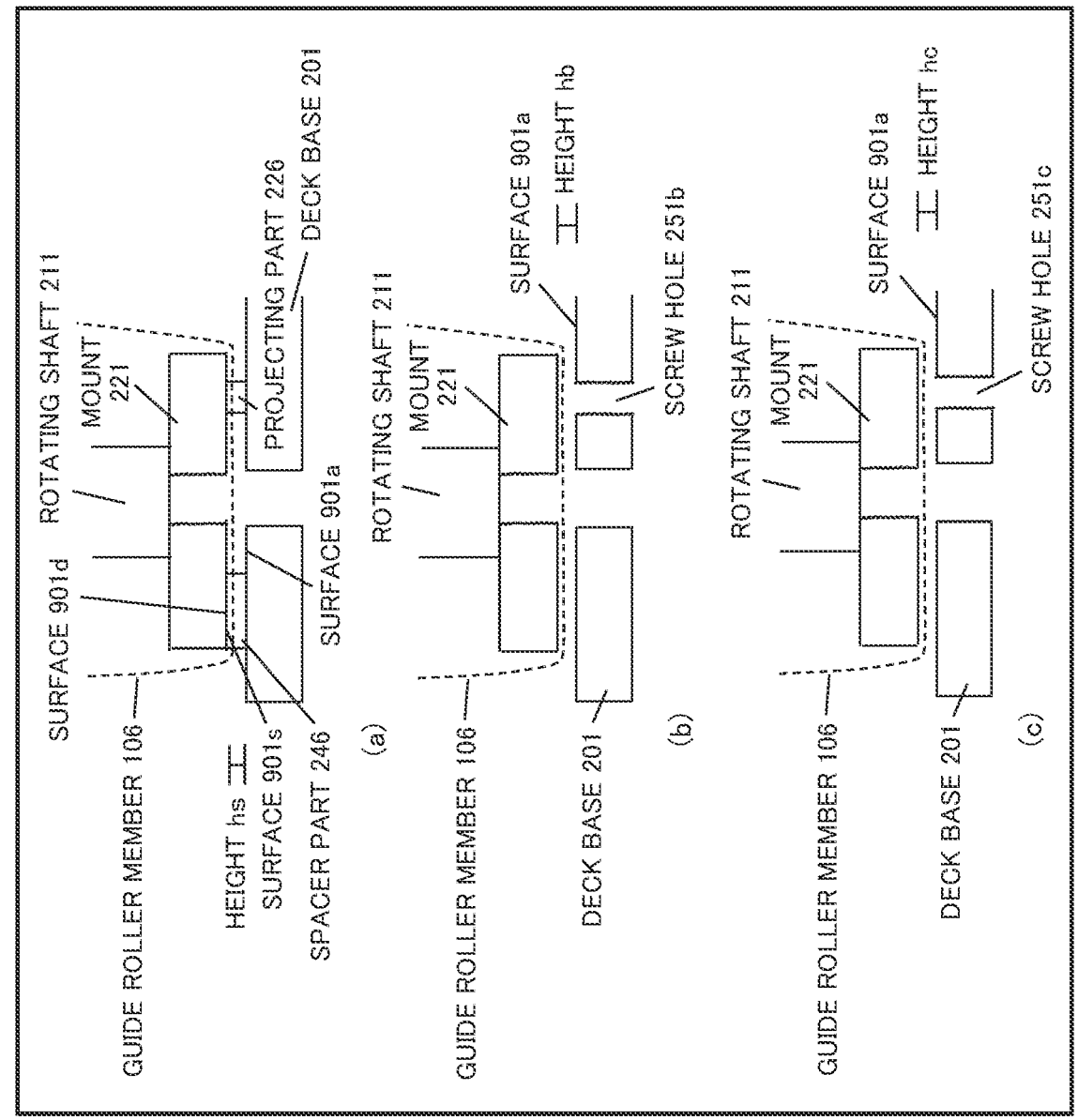
FIG. 18 is a diagram (No. 1) illustrating an installation procedure of the guide roller member to the deck base according to the second example embodiment.
Figure 19:
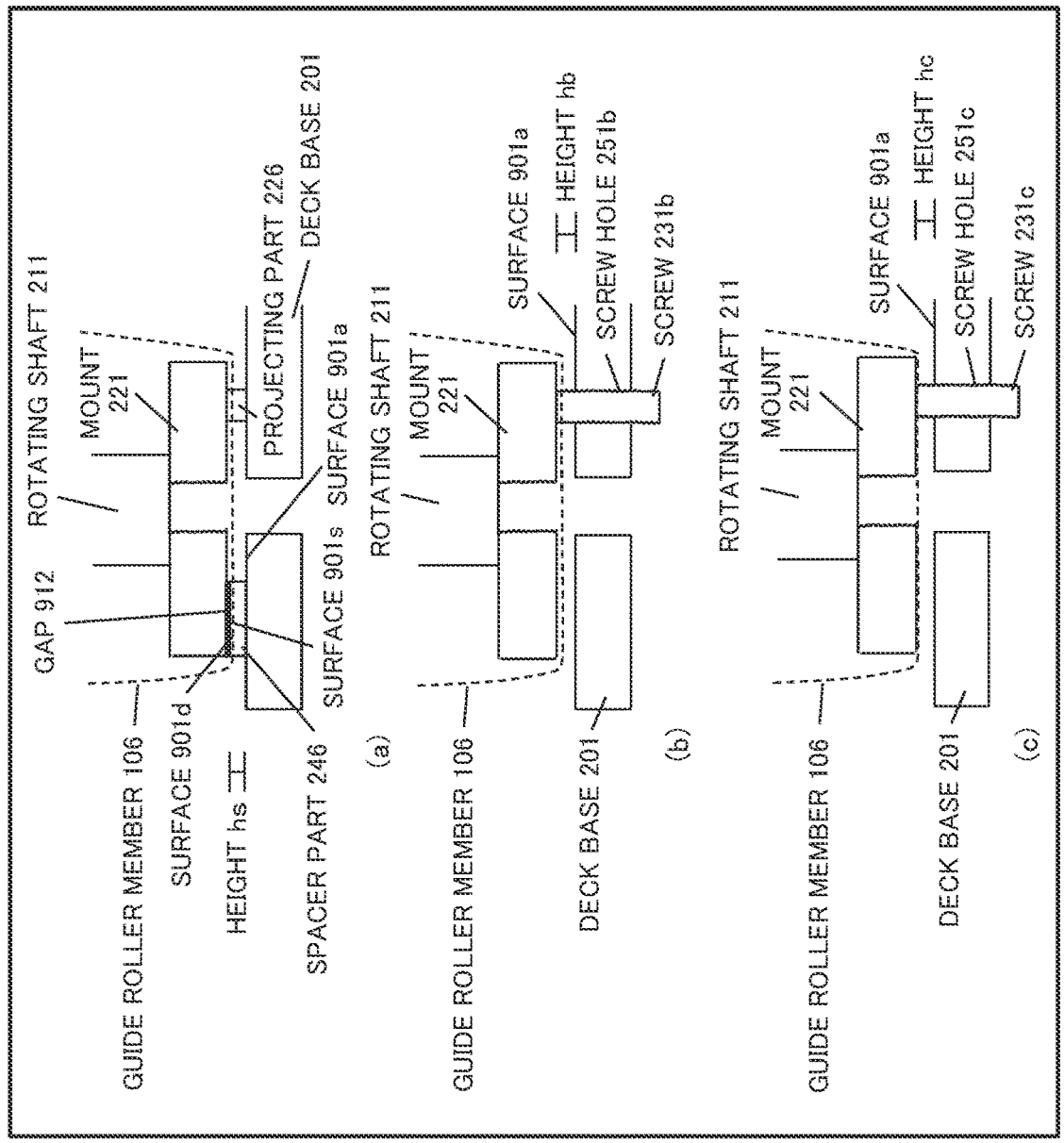
FIG. 19 is a diagram (No. 2) illustrating the installation procedure of the guide roller member to the deck base according to the second example embodiment.
Figure 20:
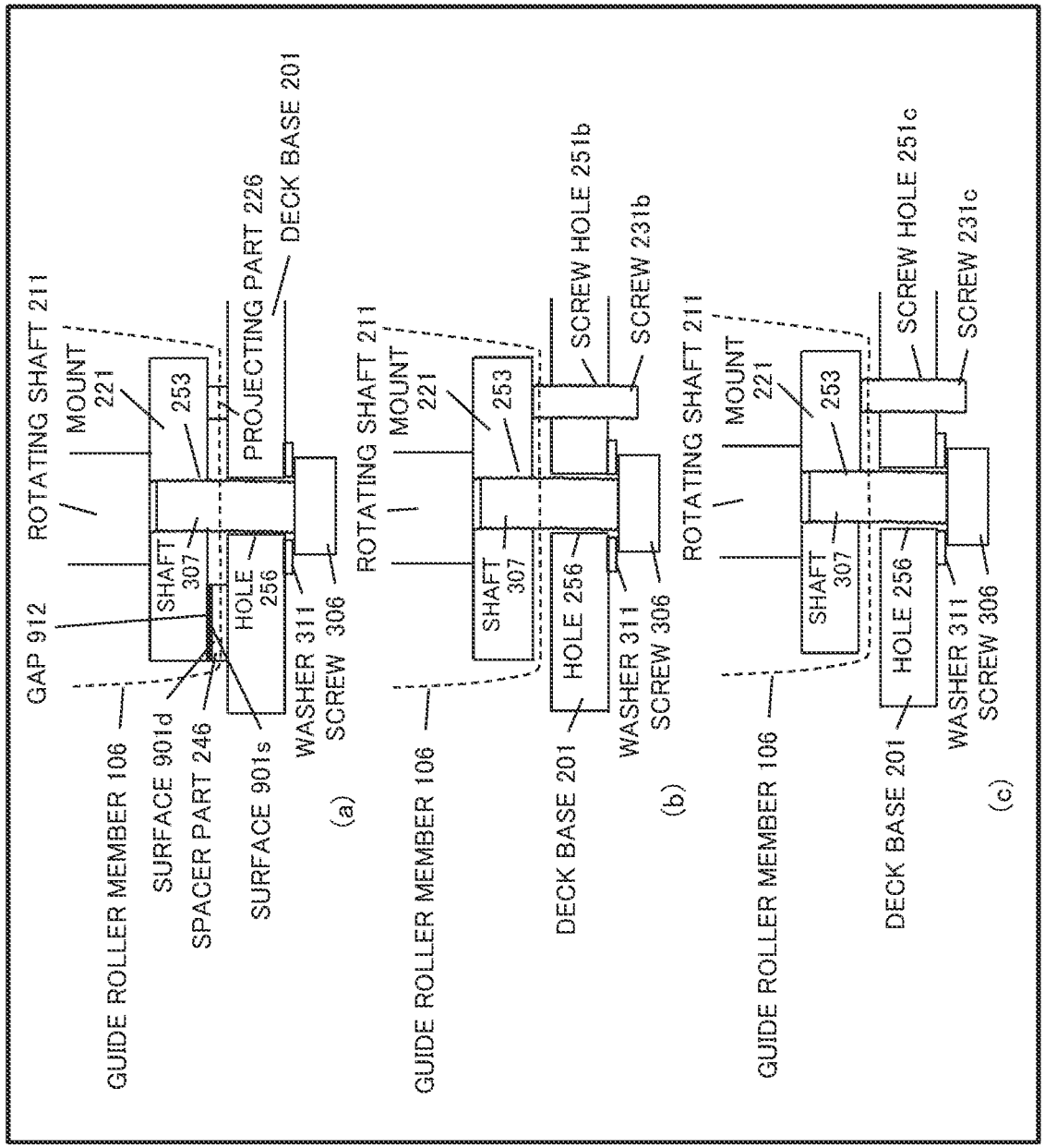
FIG. 20 is a diagram (No. 3) illustrating the installation procedure of the guide roller member to the deck base according to the second example embodiment.

FIGS. 18 to 20 are diagrams illustrating an installation procedure of the guide roller member 106 to the deck base 201 according to the present example embodiment. Each of (a), (b), and (c) in each of FIGS. 18 to 20 is a cross-sectional diagram assuming that the guide roller member 106 is cut along each of the lines 998a, 998b, and 998c illustrated in FIG. 15. Note that, in FIGS. 18 to 20, among the configurations of the guide roller member 106 illustrated in FIGS. 15 to 17, the illustrations of a guide roller 200, bearing members 236a and 236b, and the upper part of a rotating shaft 211 are omitted.

First, as illustrated in FIG. 18(a), the mount 221 is placed on the deck base 201 in such a way that the central axis of the screw hole 253 coincides with the central axis of the hole 256 as illustrated in FIGS. 8(a) to (c). This configuration allows the mount 221, the rotating shaft 211 being secured to the mount 221, and the unillustrated bearing members and the guide roller being connected to the rotating shaft 211 to be placed on the spacer part 246 and the projecting part 226 without support.

In the state illustrated in FIG. 18, screws 231b and 231c are inserted into screw holes of the deck base 201.

FIGS. 19(a) to (c) are diagrams illustrating how each of the screws 231b and 231c is inserted into each of screw holes 251b and 251c of the deck base 201.

In this state, the heights hb and hc being a distance between each upper end of the screws 231b and 231c and the surface 901a being the upper surface of the deck base 201 are set in such a way as to be slightly higher than the height hs being a distance between a surface 901s being the upper surface of the spacer part 246 and the surface 901a. Thus, a gap 912 being a minute gap is formed above the surface 901s.

In FIGS. 19(a) to (c), the guide roller member 106 is placed on the projecting part 226, the upper end of the screw 231b, and the upper end of the screw 231c.

Then, the angle of the rotating shaft 211 with respect to the upper surface of the deck base is determined by fine adjustment of an insertion length of the screws 231b and 231c into the screw holes 251b and 251c, respectively. A specific method of the fine adjustment is not related to the present example embodiment, and thus the description is omitted.

Then, as illustrated in FIG. 20, the shaft of a screw 306 passes through the hole 256 and is inserted into the screw hole 253, and thus the mount 221 is secured to the deck base 201 and the finely-adjusted angle of the rotating shaft 211 being secured to the mount 221 with respect to the upper surface of the deck base is maintained.

In this state, the spacer part 246 is maintained without being removed unlike the jig 301 according to the second example embodiment. Further, in this state, the gap 912 above the spacer part 246 is also maintained.

A left edge of the spacer part 246 in FIG. 20(a) is placed in such a way as to overlap the lower left edge of the mount 221. Thus, the state of FIG. 20 hardly causes the spacer part 246 to interfere with a position of other configurations of the magnetic tape device. The same also applies to a case where the left edge of the spacer part 246 is placed at the lower right of the left edge of the mount 221.

In the above description according to the present example embodiment, the case where the spacer part is secured to the deck base has been described, however the spacer part may be secured to the mount instead of the deck base.

Advantageous Effects

In the guide roller member and the deck base (the guide roller member and the like) according to the present example embodiment, the deck base or the mount is provided with the spacer for roughly adjusting the inclination of the guide roller member with respect to the deck base. Thus, the guide roller member and the like according to the present example embodiment do not need to use the jig 301 or the like in the description of the first example embodiment for the rough adjustment as in the guide roller member and the like according to the first example embodiment. Therefore, the guide roller member and the like according to the second example embodiment can reduce the time and effort required for the rough adjustment.

FIG. 21 is a block diagram illustrating a configuration of a member 202x being a minimum configuration of the member according to the example embodiments.

The member 202x includes a base body 201x and a guide roller member 106x.

The guide roller member 106x is secured to the base body 201x and is meant for determining an advancing direction for a predetermined tape. The guide roller member 106x includes a base part and a rotating shaft being secured to the base part, which are not illustrated. The base part comes into contact, simultaneously and on the same side as the rotating shaft in relation to the base body 201x, with: leading ends of a plurality of screws that are passed through a plurality of screw holes penetrating the base body 201x; and a projecting part that is connected to or comes into contact with the base part.

Thus, the angle of the rotating shaft with respect to the base body 201x can be adjusted by a projected length of each of the two screws from the base body. Therefore, the member 202x enables adjustment of the inclination of the guide roller member with respect to the base body.

Accordingly, by the above-described configuration, the member 202x is able to produce an advantageous effect described in the section of [advantageous effects of invention].

Note that the member 202x illustrated in FIG. 21 is, for example, a combination of the guide roller member 106 and the deck base 201 illustrated in FIGS. 2 to 20. The base body 201x is, for example, the deck base 201 illustrated in FIGS. 2 to 20. The guide roller member 106x is, for example, the guide roller member 106 illustrated in FIGS. 2 to 20. The rotating shaft is, for example, the rotating shaft 211 illustrated in FIGS. 2 to 20. The projecting part is, for example, the projecting part 226 illustrated in FIGS. 3, 4, 6 to 8, 10, 11, 13, 15, 16, 18, and 19. The plurality of screw holes are, for example, the screw holes 251b and 251c illustrated in FIGS. 5 to 8, 10, 11, 13, and 17 to 20. The plurality of screws are, for example, the screws 231b and 231c illustrated in FIGS. 3, 5 to 11, 13, 15, and 17 to 20.

The example embodiments of the present invention have been described above, but the present invention is not limited to the example embodiments described above, and further modification, replacement, and adjustment can be added without departing from a basic technical idea of the present invention. For example, a configuration of an element illustrated in the drawings is one example for facilitating understanding of the present invention, and the present invention is not limited to the configuration illustrated in the drawings.

A part or all of the above-described example embodiments may also be described as the following supplementary notes, but are not limited to the following.

(Supplementary Note 1)
A member including
a base body and
a guide roller member that is secured to the base body and that determines an advancing direction for a predetermined tape, wherein
the guide roller member includes a base part and a rotating shaft that is secured to the base part, and
the base part comes into contact, simultaneously and on a same side as the rotating shaft in relation to the base body, with leading ends of a plurality of screws that are passed through a plurality of screw holes penetrating the base body, and a projecting part that is connected to or comes into contact with the base part.

(Supplementary Note 2)
The member according to supplementary note 1, wherein
a spacer is provided between the base body and the base part.

(Supplementary Note 3)
The member according to supplementary note 2, wherein
the spacer is provided between one of the plurality of screws and another of the plurality of screws.

(Supplementary Note 4)
The member according to supplementary note 2 or 3, wherein the spacer is connected to any one of the base body and the base part.

(Supplementary Note 5)

The member according to any one of supplementary notes 2 to 4, wherein
a thickness of the spacer is thinner than a height of the projecting part from the base body.
(Supplementary Note 6)
The member according to any one of supplementary notes 2 to 5, wherein
the guide roller member can be placed on the projecting part and the spacer on the base body prior to the securement.
(Supplementary Note 7)
The member according to any one of supplementary notes 2 to 6, wherein
the securement is performed by inserting a third screw into a third screw hole being formed in the base part through a hole being formed in the base body.
(Supplementary Note 8)
The member according to any one of supplementary notes 2 to 7, wherein
the rotating shaft and a guide roller that comes into contact with the tape are connected via a bearing member.
(Supplementary Note 9)
The member according to any one of supplementary notes 1 to 8, wherein
the tape is a magnetic tape.
(Supplementary Note 10)
The member according to supplementary note 9, wherein
the member can be used for a magnetic tape device.
(Supplementary Note 11)
The member according to supplementary note 10, wherein
the base body is a deck base of the magnetic tape device.
(Supplementary Note 12)
A magnetic tape device including
the member according to any one of supplementary notes 1 to 8, wherein
the tape is a magnetic tape.
(Supplementary Note 13)
An adjustment method being a method of adjusting an angle between a rotating shaft and a base body in a member, the member including
the base body, and
a guide roller member, being secured to the base body, for guiding a tape to a predetermined position, wherein
the guide roller member includes a base part, the rotating shaft being secured to the base part, and a guide roller that can rotate around the rotating shaft, and
the base part is placed on and secured to a leading end of a first screw being inserted into a first screw hole being formed in the base body, a leading end of a second screw being inserted into a second screw hole being formed in the base body, and a projecting part being connected or in contact with the base part, the method including:
placing the guide roller member on a spacer and the projecting part on the base body;
adjusting a height of each of the leading end of the first screw and the leading end of the second screw from the base body; and
subsequently performing the securement.
(Supplementary Note 14)
The adjustment method according to supplementary note 13, wherein
the spacer is connected to any one of the base body and the base part.
(Supplementary Note 15)
The adjustment method according to supplementary note 13, wherein the spacer is not connected to any one of the base body and the base part and is removed after the adjustment.
(Supplementary Note 16)
The adjustment method according to any one of supplementary notes 13 to 15, wherein
the tape is a magnetic tape.
(Supplementary Note 17)
The adjustment method according to any one of supplementary notes 13 to 15, wherein
the member can be used for a magnetic tape device.
(Supplementary Note 18)
The adjustment method according to supplementary note 17, wherein
the base body is a deck base of the magnetic tape device.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-206730, filed on Nov. 1, 2018, the disclosure of which is incorporated herein in its entirety by reference.

REFERENCE SIGNS LIST

100 Magnetic tape device
106, 106a, 106b, 106c, 106d Guide roller member
200 Guide roller
201 Deck base
211 Rotating shaft
216 Bearing
221 Mount
226 Projecting part
231b, 231c Screw
236a, 236b Bearing member
246 Spacer part
251b, 251c, 253 Screw hole
256 Hole
261 Reel
271 Surface
272 Slipper protection
301 Jig
306 Screw
307 Shaft
311 Washer
901a, 901b, 901c, 901d Surface
912 Gap
998a, 998b, 998c Line

What is claimed is:
1. A member comprising
a base body, and
a guide roller member that is secured to the base body and that determines an advancing direction for a predetermined tape, wherein
the guide roller member includes a base part and a rotating shaft that is secured to the base part, and
the base part comes into contact, simultaneously and on a same side as the rotating shaft in relation to the base body, with leading ends of a plurality of screws that are passed through a plurality of screw holes penetrating the base body, and a projecting part that is connected to or comes into contact with the base body, wherein a spacer having a thickness less than a height of the projection part from the base body, is located between the base body and the base part, a tilt between the guide roller member and the base body is created when the guide roller member is placed on the base body due to a difference in height between the spacer and the projection part, when adjusting an angle between the rotation shaft and the base body, in a rough adjustment, the plurality of screws are inserted into the plurality of screw holes and the leading ends of the plurality of screws are brought into contact with the base part, and in a fine adjustment, a height of each of the leading ends of the plurality of screws from the base body is adjusted.

2. The member according to claim 1, wherein the spacer is provided between one of the plurality of screws and another of the plurality of screws.

3. The member according to claim 1, wherein the spacer is connected to any one of the base body and the base part.

4. The member according to claim 1, wherein the guide roller member can be placed on the projecting part and the spacer on the base body prior to securement.

5. The member according to claim 1, wherein securement is performed by inserting a third screw into a third screw hole being formed in the base part, through a hole being formed in the base body.

6. The member according to claim 1, wherein the rotating shaft and a guide roller that comes into contact with the tape are connected via a bearing member.

7. The member according to claim 1, wherein the tape is a magnetic tape.

8. The member according to claim 7, wherein the member can be used for a magnetic tape device.

9. The member according to claim 8, wherein the base body is a deck base of the magnetic tape device.

10. A magnetic tape device comprising the member according to claim 1, wherein the tape is a magnetic tape.

11. An adjustment method for adjusting an angle between a rotating shaft and a base body in a member, the member including the base body, and a guide roller member, being secured to the base body, for guiding a tape to a predetermined position, wherein the guide roller member includes a base part, the rotating shaft being secured to the base part, and a guide roller that can rotate around the rotating shaft, and the base part is placed on and secured to a leading end of a first screw being inserted into a first screw hole being formed in the base body, a leading end of a second screw being inserted into a second screw hole being formed in the base body, and a projecting part being connected to or in contact with the base body, the method comprising:

locating a spacer having thickness less than a height of the projection part from the base body, between the base body and the base part, and creating a tilt between the guide roller member and the base body by placing the guide roller member on the spacer and the projecting part on the base body due to a difference in height between the spacer and the projection part in a rough adjustment the angle, inserting the first and second screws into the first and second screw holes and the leading ends of the first and second screws are brought into contact with the base part, in a fine adjustment of the angle, adjusting a height of each of the leading end of the first screw and the leading end of the second screw from the base body; and subsequently performing securement.

12. The adjustment method according to claim 11, wherein the spacer is connected to any one of the base body and the base part.

13. The adjustment method according to claim 11, wherein the spacer is not connected to any one of the base body and the base part and is removed after adjustment.

14. The adjustment method according to claim 11, wherein the tape is a magnetic tape.

15. The adjustment method according to claim 11, wherein the member can be used for a magnetic tape device.

16. The adjustment method according to claim 15, wherein the base body is a deck base of the magnetic tape device.

* * * * *